(12) United States Patent
Meyer et al.

(10) Patent No.: US 6,356,953 B1
(45) Date of Patent: Mar. 12, 2002

(54) SYSTEM FOR PEER-TO-PEER MASTERING OVER A COMPUTER BUS

(75) Inventors: James W. Meyer, Shoreview; Paul A. Laberge, Coon Rapids, both of MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/588,740

(22) Filed: Jun. 6, 2000

Related U.S. Application Data (63) Continuation of application No. 09/053,392, filed on Mar. 31, 1998, now Pat. No. 6,073,198.

(51) Int. Cl.$^7$ .......................... G06F 13/00; G06F 13/42
(52) U.S. Cl. ........................ 709/253; 710/101; 710/128; 370/402
(58) Field of Search ................................. 710/101, 128, 710/100, 105, 39, 112, 263, 129, 107; 709/203, 253; 340/825.61; 370/401, 402, 911; 711/140, 150

(56) References Cited

U.S. PATENT DOCUMENTS

| 5,535,340 A | * | 7/1996 | Bell et al. |
| 5,568,620 A | | 10/1996 | Sarangdhar et al. |
| 5,594,882 A | | 1/1997 | Bell |
| 5,615,343 A | | 3/1997 | Sarangdhar et al. |
| 5,632,021 A | | 5/1997 | Jennings et al. |
| 5,682,516 A | | 10/1997 | Sarangdhar et al. |
| 5,761,444 A | | 6/1998 | Ajanovic et al. |
| 5,761,462 A | | 6/1998 | Neal et al. |
| 5,870,567 A | | 2/1999 | Hausauer et al. |
| 5,881,253 A | | 3/1999 | Seeman |
| 5,937,171 A | | 8/1999 | Sarangdhar et al. |
| 6,073,198 A | * | 6/2000 | Meyer et al. |
| 6,098,134 A | * | 8/2000 | Miichels et al. |
| 6,178,477 B1 | * | 1/2001 | Jaramillo et al. |
| 6,195,722 B1 | * | 2/2001 | Ram et al. |

FOREIGN PATENT DOCUMENTS

| EP | 0710 913 A1 | 10/1995 |
| EP | 803 807 A2 | 10/1997 |

OTHER PUBLICATIONS

Intel, Intel 450KX/GX PCI set Overview, pp. 1–102 (1996).

* cited by examiner

*Primary Examiner*—Gopal C. Ray
(74) *Attorney, Agent, or Firm*—Knobbe, Martens, Olson & Bear, LLP.

(57) ABSTRACT

A system for communicating information between requester and target devices in a computer having a multiple bus architecture. The system supports deferred transactions of cache line read requests over a host bus, e.g., the Pentium II or Pentium Pro (P6) bus. The system employs a host bridge to issue deferred transactions over the P6 bus without interrupting or involving the main processor. The system comprises a first device, electrically connected to the requester, which receives a request from the requester. The system further comprises a second device, electrically connected to the first device, which transmits the request with a defer enable signal over the P6 bus. The system further comprises a third device, electrically connected to the P6 bus, which communicates the request having a defer enable signal to the target.

18 Claims, 5 Drawing Sheets

SYSTEM FOR PEER-TO-PEER MASTERING OVER A COMPUTER BUS

RELATED APPLICATIONS

"This application is a continuation of U.S. patent application entitled "SYSTEM FOR PEER-TO-PEER MASTERING OVER A COMPUTER BUS" having application Ser. No. 09/053,392, filed on Mar. 31, 1998, now issued as U.S. Pat. No. 6,073,198."

BACKGROUND OF THE INVENTION

1. Field of the Invention

The invention relates generally to information processing systems, such as a personal computer (PC). More particularly, the invention relates to processing transactions in a computer system having multiple bus architecture.

2. Background of the Related Art

Modern computer systems, such as personal computers (PCs), process an enormous amount of information in a relatively short time. To perform its sophisticated functions, a computer system typically includes a main processor, memory modules, various system and bus control units, and a wide variety of data input/output (I/O) devices. Typically, these computer devices communicate control and data signals in accordance with a predetermined signal protocol. However, with the employment of a multiple bus architecture, these devices often communicate across a plurality of bus protocols and bridging devices. A bridging device performs protocol conversion between two buses, thereby allowing each device involved in a transaction to know how and when the other device is going to perform a particular task.

A transaction over a particular bus normally involves a requesting device (the "requester") and a responding device (the "target"). The requester requests the transfer of data or a completion signal from a target in the system. The request typically includes a number of control bits indicating the type of request and an address of the desired data or device. The target, in turn, responds to the transaction by sending a completion signal along with any data if necessary. With the presence of various devices acting as requesters and targets in the system, bus protocols often include the ability to handle multiple transactions among multiple devices concurrently. One example of such a bus is the pipelined bus which allows requests by various requesters to be pending (i.e., unfulfilled) over the bus at the same time. The incorporation of separate data and address buses makes this possible. In a pipelined transaction, a requester sends a request on the address bus, and a target returns a reply on the data bus. Multiple requesters may send multiple requests over the address bus, and multiple targets may respond in the same order of the requests over the data bus. In a special pipelined bus, commonly referred to as the split transaction bus, the order of the responses does not have to occur in the same order as their corresponding requests. Each transaction is tagged so that the requester and the target keep track of the status of the transaction. This characteristic permits maximum utilization of the pipelined bus by effectively increasing bus bandwidth. This advantage, however, is obtained at a cost of experiencing a higher latency than when a request is held during the pendency of a transaction.

The Pentium II or Pentium Pro processor is one example of a processor which supports a pipelined bus, commonly referred to as the P6 bus. The P6 bus includes a 64-bit external data bus and a 32- or 36-bit address bus. The speed of the P6 bus may be 66 or 100 MHz, and the processor clock rate may be two, three, or four times the speed of the bus. The P6 bus employs "packet" transmission to transmit data the same way that a network transmits packets. A data packet is known as a chunk which may be up to 64 bits. The P6 bus supports split transactions. Accordingly, a P6 processor sends an address and then releases the bus for use by other bus requesters while waiting for the target device (e.g., a main memory) to respond. When the target is ready to respond, the target returns the requested data over the data bus in 64-bit packets.

The maximum data transfer that is supported by the P6 processor bus is four 64-bit wide transfers, commonly referred to as a "cache line" transfer. As noted above, the P6 processor supports split transactions. This feature is often characterized as a "deferred response" whereby a target device defers its response to a request by a requester. A deferred response allows the P6 bus to be freed to execute other requests while waiting for the response from a device with relatively long latency. A single P6 processor may have up to four transactions outstanding at the same time.

Figure 1:
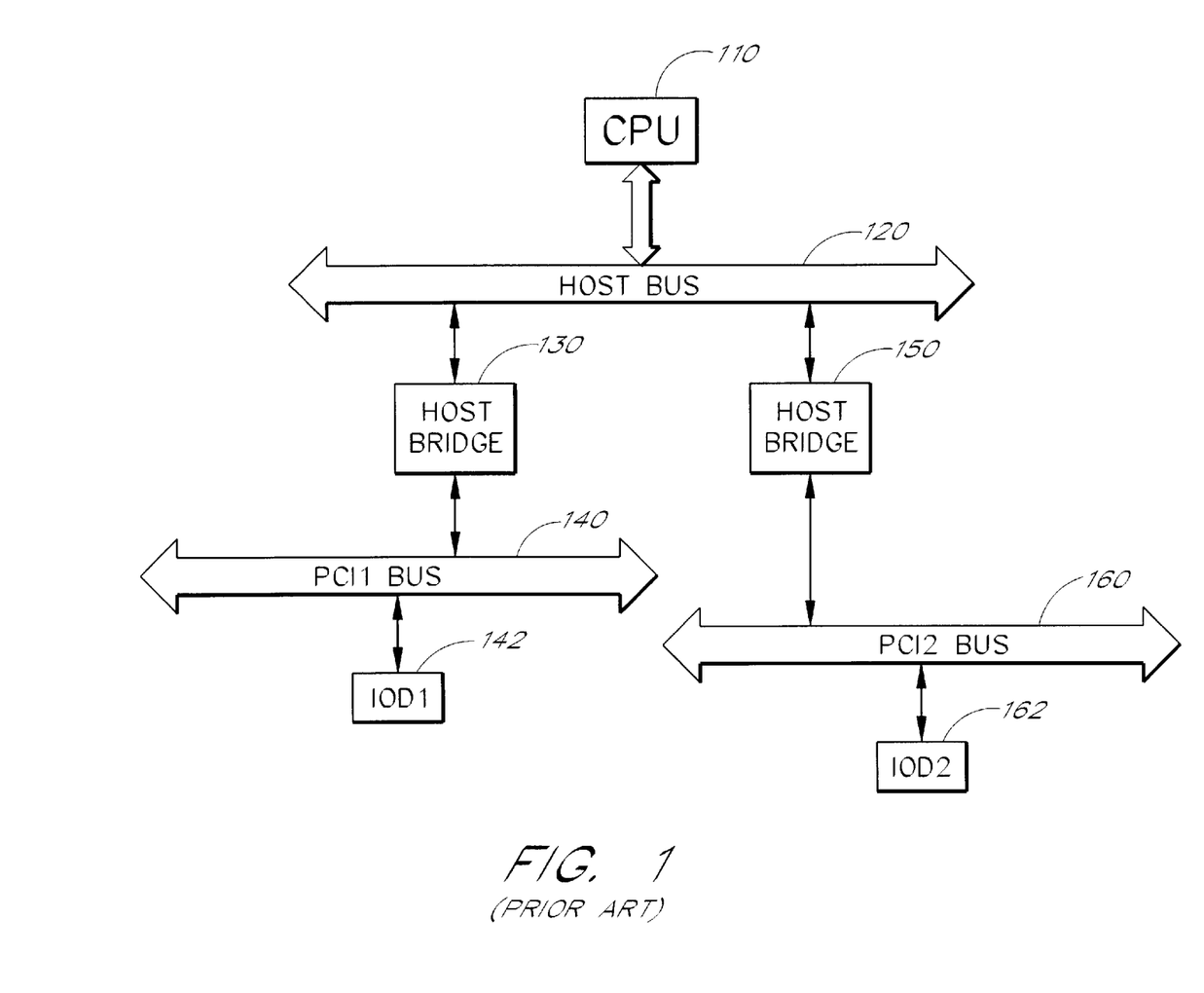
FIG. 1 is a functional block diagram of an exemplary computer hardware layout.

FIG. 1 is a functional block diagram of an exemplary computer hardware layout having a multiple bus architecture. As shown in FIG. 1, a main processor CPU 110 is connected to a Host bus 120. A Host bridge 130 connects the Host bus 120 to a secondary bus PCI1 bus 140. One or more input/output devices IOD1 142 is connected to the PCI1 bus 140. The Host bridge 130 supports communication between PCI devices, e.g., IOD1 142, and devices present on the Host bus 120 or elsewhere in the system. Another Host bridge 150 is often employed to connect another PCI2 bus 160 to the Host bus 120. Moreover, other I/O devices, e.g., IOD2 162, are connected to the PCI2 bus 160. Similarly, the Host bridge 150 supports communication between PCI devices, e.g., IOD2 162, and devices present on the Host bus 120 or elsewhere in the system.

A bus transaction over the Host bus 120 is often in the form of a read request issued by a requester device. For example, in single chunk requests, the IOD1 142 on the PCI1 bus 140 may issue a read request to the IOD2 162 on the PCI2 bus 160. The purpose of the read request may be to obtain data being processed by or available at the IOD2 162. The Host bridge 130 receives the read request from the IOD1 142, decodes the address from the read request, and issues a single chunk (i.e., 64 bits) read request over the Host bus 120 to the PCI2 bus 160. A cache line read may not be issued to the PCI2 bus 160 because a PCI bus does not support a cache line read (i.e., four 64 bits). A cache line read on a PCI bus triggers a retry request after the target transfers one or more words to the requester. The retry request is often triggered because a PCI device may need to execute other requests before servicing the read request. A retry request is problematic over a PCI bus because speculative reads are not permitted. A speculative read is a read operation (usually in response to a retry request) of an already read data. Hence, in response to the single chunk read request by the Host bridge 130, the Host bridge 150 detects the request and issues a single chunk read request to the IOD2 162 on the PCI2 bus 160.

There are several inherent inefficiencies with single chunk requests. A single chunk request does not utilize a host bus efficiently. In view of its limited bandwidth occupancy, a single chunk request slows down the computer system. Moreover, unless retried, a single chunk request ties up the host bus until fulfilled. A defer transaction is not an option for PCI devices because, as a bus requester, a host-PCI bridge does not support deferred transactions.

Therefore, there is a need in the technology to make a more efficient use of a host bus, e.g., the P6 bus. The utilization of full bus bandwidth on the host bus should be accommodated on secondary buses, e.g., the PCI bus. More particularly, cache line requests, which are accommodated by the host bus, should be supported by secondary buses.

SUMMARY OF THE INVENTION

To overcome the above-mentioned problems, the invention provides a system for executing peer-to-peer mastering over a host bus in a computer system. The system includes a host bridge which performs deferred bus transactions in a computer system having a multiple bus architecture. The host bridge supports communication among multiple input/output devices (IODs) without interrupting or involving the main processor.

In one embodiment of the invention, a system for communicating information between at least one requester and at least one target is provided. The system comprises a first device, electrically connected to the requester, which receives a request from the requester. The system further comprises a second device, electrically connected to the first device, which transmits the request with a defer enable signal over a host bus to the target. In another embodiment, the system comprises a first device, electrically connected to the requester, which receives a request from the requester. The system further comprises a second device, electrically connected to the first device, which transmits the request with a defer enable signal over a P6 bus. The system further comprises a third device, electrically connected to the P6 bus, which communicates the request having a defer enable signal to the target.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE INVENTION

A detailed description of the system for peer-to-peer mastering over a computer bus is provided below. In describing particular embodiments of the invention, the disclosure is not intended to limit the enumerated claims, but to serve as a particular example of the invention.

Figure 2:
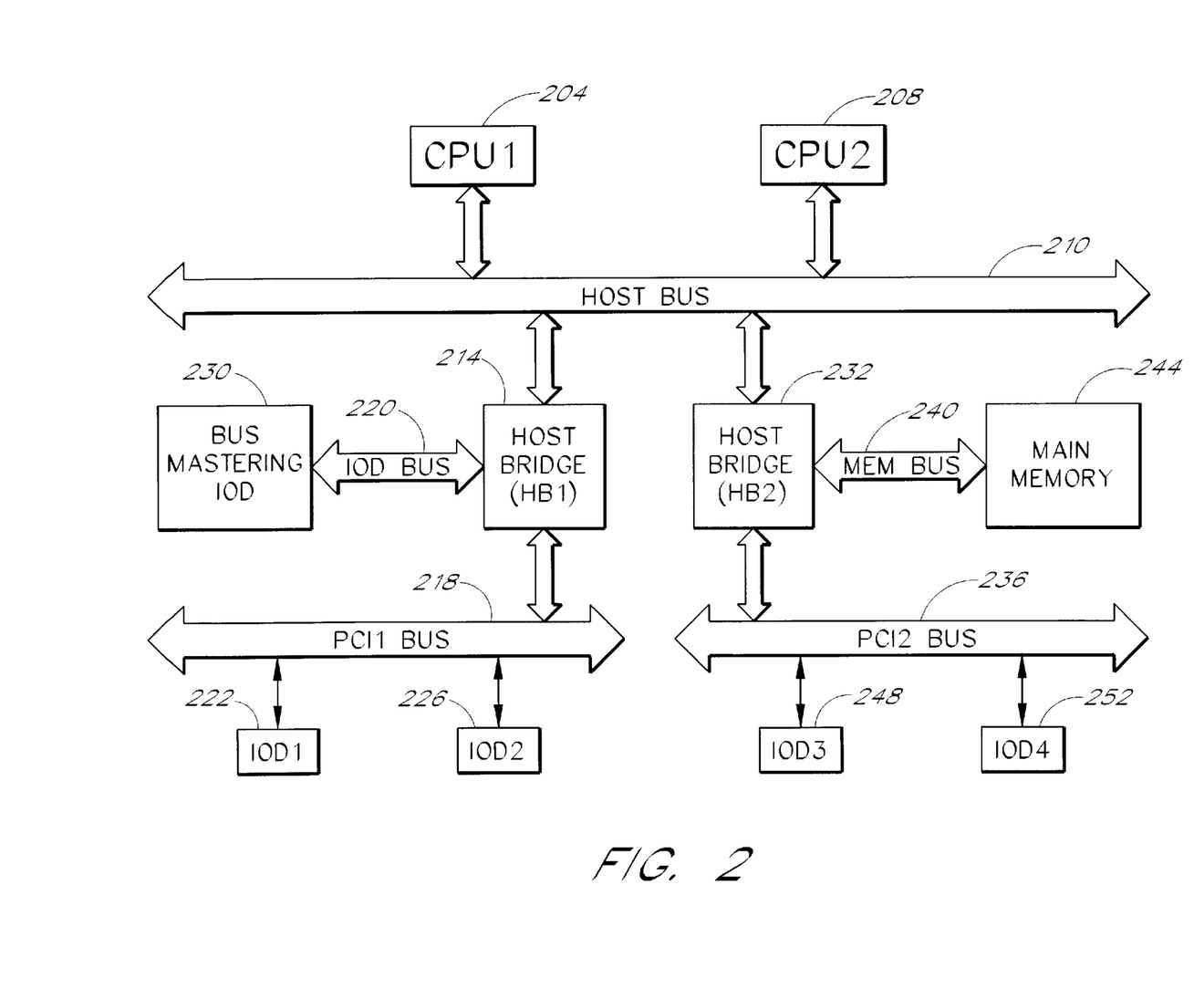
FIG. 2 is a functional block diagram of a computer system employing one embodiment of the invention.

The invention provides a system for peer-to-peer mastering over a computer bus, such as the Pentium II or Pentium Pro ("P6") bus. Other processors which support pipelined transactions may also be used. FIG. 2 is a functional block diagram of a computer system employing one embodiment of the invention. As shown in FIG. 2, one or more processors CPU1 204 and CPU2 208 are connected to a Host bus 210. The CPU1 204 and CPU2 208 may be the Pentium II or Pentium Pro (P6) processors manufactured by Intel Corporation. Using the P6 processors, the Host bus 210 is commonly referred to as the P6 bus. The P6 bus supports multiple, pipelined transactions having data transfers of four 64-bit wide words (commonly referred to as a "cache line" transfer). A host bridge (HB1) 214 is connected to the Host bus 210 to support communication between the Host bus 210 and other buses in the system, such as a PCI1 bus 218 and an input/output device (IOD) bus 220. One or more I/O devices may be connected to the PCI1 bus 218, such as IOD1 222 and IOD2 226. The devices IOD1 222 and IOD2 226 may be any PCI compatible devices, such as a LAN interface, a SCSI card, an audio card, or a graphics card. One or more I/O devices may be connected to the IOD bus 220, e.g., Bus Mastering IOD (BMIOD) 230. The BMIOD 230 may be any type of I/O device such as a hard disk, a CD-ROM, or similar.

Another Host bridge HB2 232 may also be connected to the Host bus 210 to support communication between the Host bus 210 and other buses in the system, such as a PCI2 bus 236, and a memory bus 240. The HB2 232 may be identical to the HB2 214, or may be a 82454KX/GX PCI Bridge manufactured by Intel Corporation. The memory bus 240 supports communication between the HB2 232 and a main memory 244. The PCI2 Bus 236 supports communication between the HB2 232 and multiple I/O devices, e.g., IOD3 248 and IOD4 252. The devices IOD3 248 and IOD4 252 may be any PCI compatible devices, such as a LAN interface, a SCSI card, an audio card, or a graphics card. In this embodiment, the PCI1 bus 218 and PCI2 bus 236 are standard peripheral component interconnect (PCI) buses which conform to the PCI Local Bus Specification (Revision 2.1 or later).

In this embodiment, any one of the devices CPU1 204, CPU2 208, and HB1 214 may issue "deferred" transactions on the Host bus 210. The deferred transaction capability allows the Host bus to be freed to execute other requests while waiting for the response from a request to a device with relatively long latency. Each one of the devices CPU1 204, CPU2 208, HB1 214, and HB2 232 may have up to four transactions outstanding at the same time. The number of transactions that may target a particular bus device is configured separately from the total number of transactions allowed on the bus. Each of the HB1 214 and HB2 232 may accept up to four transactions into its in-order queue (IOQ) (not shown in this figure) that target its associated buses.

Hence, for example, the HB1 214 may have a read request directed to IOD3 248 and a read request directed to the main memory 244 pending at the same time on the Host bus 210. A bus mastering IOD-type device, e.g., BMIOD 230, issues a read request to the HB1 214 over the IOD bus 220, having the main memory 244 as its destination. Another bus mastering IOD-type device may issue another read request to the HB1 214 over the IOD bus 220, having the IOD3 248 as its target. The HB1 214, in turn, may issue both read requests with a deferred capability over the Host bus 210. The HB2 232 detects and delivers each read request to its intended destination, i.e., to the main memory 244 via the memory bus 240, or IOD3 248 via the PCI2 bus 236. In view of the deferred response feature, the Host bus 210 is freed up to execute other transactions, and each read request may remain pending at the same time, until the main memory 244 and IOD3 248 are ready to respond to the BMIOD 230.

In addition to its bridging capability, the HB2 232 includes a memory controller (not shown) which comprises a DRAM Controller, a Data Path, and one or more Memory Interface Components. The combined memory controller uses one physical load on the memory bus. The memory controller includes two sets of registers (I/O space registers and configuration registers). Examples of the memory controller components include the 82453KX/GX DRAM Controller, 82452KX/GX Memory Data Path, and 82451KX/GX Memory Interface Component manufactured by Intel Corporation.

Figure 3:
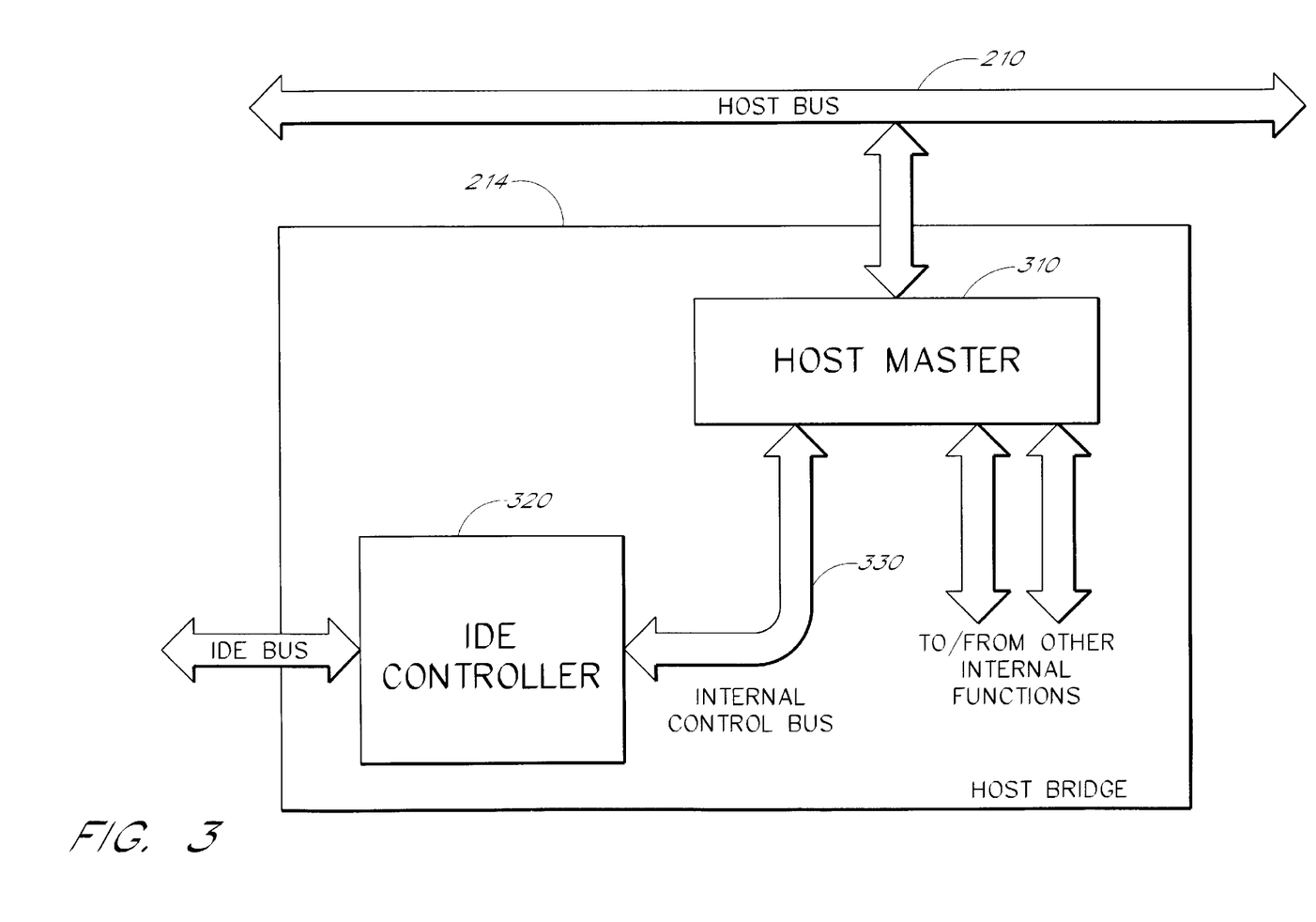
FIG. 3 is a functional block diagram of the Host bridge as used in the computer system of FIG. 2.

FIG. 3 is a functional block diagram of the Host bridge HB1 214 as used in the computer system of FIG. 2. As noted above, the HB2 232 of FIG. 2 may be designed and implemented as the HB1 214 FIG. 3. The HB1 214 comprises a Host Master (HM) 310, an integrated driver electronics (IDE) Controller 320, and an Internal Control Bus ("IC bus") 330 which supports internal communication between the IDE Controller 320 and the HM 310. The HM 310 performs several bridging functions including conversion of signal protocols between secondary buses and the Host bus 210. Additionally, the HM 310 supports deferred transactions over the Host bus 210. The IDE Controller 320 conforms to the disk interface standard based on the IBM industry standard architecture (ISA) 16-bit bus. The IDE Controller 320 controls the transfer of signal traffic between bus mastering IODs, such as the BMIOD 230, and the main processor, e.g., CPU1 204 or CPU2 208 (FIG. 2). Additionally, the IDE Controller 320 controls the transfer of signal traffic between the BMIOD 230 and the main memory 244 or other IODs in the system.

The HM 310 accepts and arbitrates requests received from PCI targets, PCI requesters, and IDE controllers. The HM 310 issues these requests to the Host bus 210. The HM 310 receives these requests from requesters via the IC bus 330. The HM 310 comprises one or more host bus interface modules (HIMs), a host master requester (HMR), a host master arbiter (HMA), an in-order queue (IOQ), a host master snooper (HMS), and a host master responder (HMP) (not shown in this figure). During each clock cycle, the HIMs register all input signals received by the HM 310 from the Host bus 210. All signals are first registered before the HM 310 makes any logic decision. The HMR accepts requests from and arbitrates access among up to four different requesters. The HMR generates one or more flag signals to the HMA to initiate arbitration. The HMR buffers the first request received from a requester, and holds off any subsequent requests from that requester until the first request is executed. The HMR further formats and provides signals to the Host bus 210.

The HMA arbitrates access to the Host bus 210 among several requesters. The HMA further maintains and tracks the state of the Host bus 210. The state of the Host bus 210 may be free, throttled, or stalled. In the free state, the HM 310 may issue requests freely over the Host bus 210. In the throttled state, the HM 310 may issue only one request over the Host bus 210. In the stalled state, the HM 310 may not issue any requests over the Host bus 210. The IOQ is a register which stores information about (up to eight) transactions which may be outstanding on the Host bus 210. The IOQ stores request codes (each identifying the requester which issued the request, i.e., an IDE or PCI device), byte enables, length of transaction, command codes (type of transaction), and a snoop done bit. The snoop done bit indicates that the snoop phase is complete. As specified in Intel's Pentium II or Pentium Pro processor standard, the snoop phase occurs during a bus transaction and is controlled by the HIT# (hit), HITM# (hit modified), and DEFER# (defer) host bus interface signals. The IOQ head indicates which transaction to be completed next on the Host bus 210. The IOQ tail indicates the next position in the IOQ to be filled. The HMS samples one or more snoop signals, and tracks the "snoop stall" state to determine when the snoop phase is complete. The HMP tracks the response phase on, provides the write data to, and accepts the read data from the Host bus 210.

The IC bus 330 comprises a 32- or 36-bit address bus and a 64-bit data bus for supporting communication between the IDE controller 320 and the HM 310. There are several IC bus interface signals which characterize the operation of the IC bus 330. The interface signals include: REQ, REQ_BUSY, ADDR, BE, COUNT, STATUS, REQ_RETRY, REQ_DEFER, DEFER_ENABLE, DEFER_ID, DATA_DEFER, DATA_RETRY, WRITE_STROBE, WRITE_DATA, WRITE_BUSY, WRITE_COMPLETE, READ_STROBE, READ_DATA, AND READ_BUSY. The REQ signal is asserted by a requester device to request the transfer of certain data from a target device. In one embodiment, if the requester is provided with capability for multiple outstanding requests, then multiple REQ signals may be asserted by the same requester on the IC bus 330. The requester and target device are responsible for keeping track of their respective outstanding transactions.

The REQ_BUSY signal represents the commonly known handshake signal between devices. The REQ_BUSY signal is typically issued by the target to the requester to indicate that the target is ready to receive the request command. By asserting the REQ_BUSY signal, the target further indicates that the target has read the address, byte enables, count and status bits. The ADDR signal is a 32- or 36-bit address signal which may be issued by any device, i.e., the requester or target, to indicate the device's address. The BE signal represents an 8-bit field for a byte enable asserted by the requester during a request transaction. The COUNT signal is a 2-bit field representing the type of transfer being requested. For example, a 00 represents one 64-bit transfer, 01 represents two 64-bit transfers, 10 represents three 64-bit transfer, and 11 represents four 64-bit transfers, between the requester and target. The STATUS signal is a multi-bit field representing the type of request. For instance, a 0000 is an interrupt acknowledge, 0001 is a special cycle, 0010 is an I/O read, 0011 is an I/O write, 0110 is a memory read, 0111 is a memory write, 1010 is a config read, 1011 is a config write, and 1110 is a defer enable.

The REQ_RETRY signal is asserted by the target to the requester indicating that the preceding request should be retransmitted by the requester. Typically, a target asserts the REQ_RETRY signal when the target has lost and is unable to recover the request, or the target is not ready to process the request at the time it was received. The REQ_DEFER signal is asserted by the target to the requester indicating that the request has been deferred for execution at a later time. By asserting the REQ_DEFER signal, the target advises the requester to remove the request from the requester's IOQ and release the bus. A deferred response is possible when the defer enable of the STATUS signal is asserted. The DEFER_ENABLE signal is asserted by a requester to indicate that the requester supports deferred transactions if the target device is not available to execute the request promptly. The DEFER_ID signal is asserted by both the requester and target devices to keep track of the identity and order of the defer transaction in the request queue. The DATA_DEFER signal is asserted by the target to the requester indicating that the data is now being sent in response to the deferred request.

The WRITE_STROBE signal indicates that the write data is valid from the requester for data transfer to the target. The WRITE_DATA signal indicates the 64-bit on the data bus to be written by the requester into the target. The WRITE_COMPLETE signal is a response issued by the target to the requester indicating that the target has completed servicing the write request at the top of the IOQ. The READ_STROBE signal is a command issued by the target to the requester indicating that the read data is valid for data transfer to the requester. The READ_DATA signal indicates the 64-bit on the data bus to be read by the target into the requester. The READ_BUSY signal is a response issued by the requester to the target indicating that the data path in the requester is presently busy and, thus, not available to receive the read data.

Figure 4:
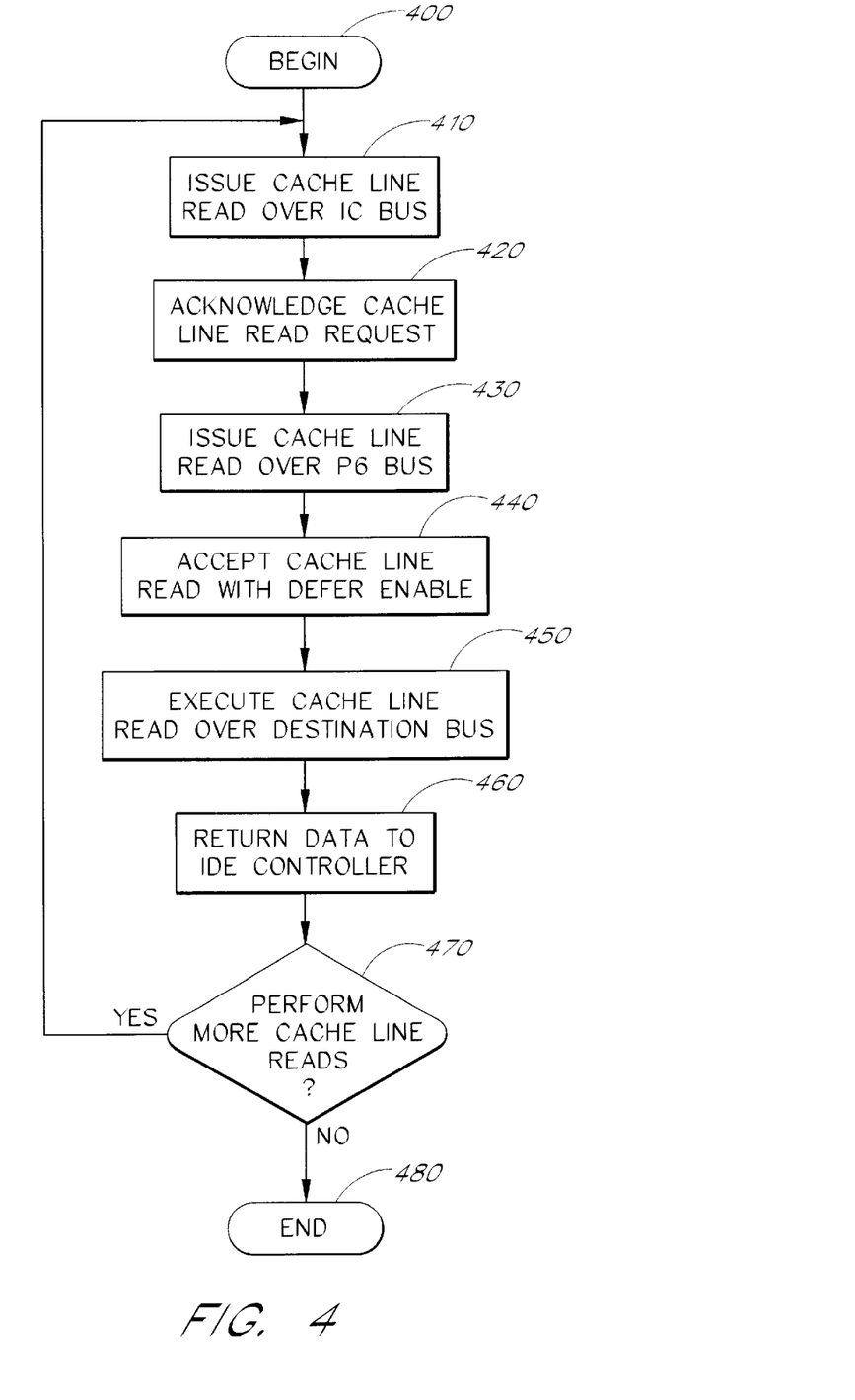
FIG. 4 is a flow chart describing the execution of a bus transaction in the computer system of FIG. 2.

The IDE controller 320 and the HM 310 manipulate the above signals in conformance with the protocol of the IC bus 330 to communicate requests between IODs and the Host bus 210. FIG. 4 is a flow chart describing the execution of a bus transaction in the computer system of FIG. 2. As shown in FIG. 4, the process typically begins at step 400 when the main processor, e.g., CPU1 204 or CPU2 208, configures the IDE Controller 320 and I/O devices, e.g., the BMIOD 230. The BMIOD 230 issues a read request to the IDE Controller 320 via the IOD bus 220 indicating its intent to read data from a target device in the system. The read request includes, among other things, the address of the target device, location of the data in the memory space of the target device, and other control and identification information. At step 410, the IDE Controller 320 acknowledges the read request and issues a cache line read (i.e., 4×64 bits) over the IC bus 330 (FIG. 3). To initiate a cache line read request, the IDE Controller 320 asserts the REQ signal on the IC bus 330 to the HM 310. At step 420, the HM 310 acknowledges the cache line read request and, when ready to execute the request, accepts the request by asserting a REQ_BUSY signal and REQ_DEFER signal on the IC bus 330. As noted above, by asserting the REQ_BUSY signal, the HM 310 establishes a handshake with the IDE Controller 320 to indicate that the HM 210 is ready to accept the request information. In establishing a handshake, the active or asserted REQ_BUSY signal occurs when the signal is at a low voltage level. By asserting the REQ_DEFER signal, the HM 310 indicates to the IDE Controller 320 that the request may be deferred by the target, in the event that the target is not ready to execute the request promptly.

As noted above, in this embodiment, the Host bus 210 may be a P6 bus as specified by the Pentium II or Pentium Pro processor's standard of Intel Corporation. Hence, the Host bus 210 conforms to the host bus interface signals specified by the Pentium II or Pentium Pro processor bus. The Pentium II or Pentium Pro processor bus standard designates the EXF#1 as the extended function signal for Defer Enable to support deferred transactions. Pursuant to the Pentium II or Pentium Pro specifications, the "#" symbol at the end of the signal name indicates that the active, i.e., asserted state occurs when the signal is at a low voltage level. At step 430, the HM 310 issues a cache line read request over the Host bus 210 with the Defer Enable signal asserted. In addition to asserting the Defer Enable signal, the HM 310 includes a unique Defer ID X to identify or tag the defer transaction so that the requester recognizes the defer response upon receipt. At step 440, the target HB2 232 detects and accepts the cache line read request based on the target address information contained therein. Hence, for example, if the read request is destined to the main memory 244, then the read request contains address information indicating the main memory 244 as its destination, i.e., target. Thus, the HB2 232 recognizes that the request on the Host bus 210 belongs to the main memory 244 (which is connected to the HB2 232) based on the address information of the main memory 244.

At step 450, the HB2 232 issues the cache line read request on the bus (e.g., memory bus 240) connected to the target device, e.g., the main memory 244. The target, in turn, receives the cache line read request and, if not busy, returns the desired data in response to the read request having a destination address of the requester device, i.e., BMIOD 230. If the target is busy, or data is not available, the target defers its response and instructs the HB2 232 to release the Host bus 210 to execute other transactions. When the target is ready, the target returns the desired data to the requester via the HB2 232. At step 460, the HM 310 detects the data incoming from the target and returns the data to the IDE Controller 320 via the IC bus 330. In conformance with the IC bus signal interface, the HM 310 returns the data with the DATA_DEFER signal asserted to indicate that this is the data response from the previous deferred request. The IDE Controller 320 forwards the data to the requester BMIOD 230. At step 470, the IDE Controller 320 determines if there are any more cache line read requests to be performed. More read requests may be needed if the requester desires additional data which were not contained in the received cache line read. If the IDE Controller 320 determines that there are more cache line reads desired, then the process starts over at step 410. If no more cache line reads are desired, then the process terminates at step 480.

Figure 5:
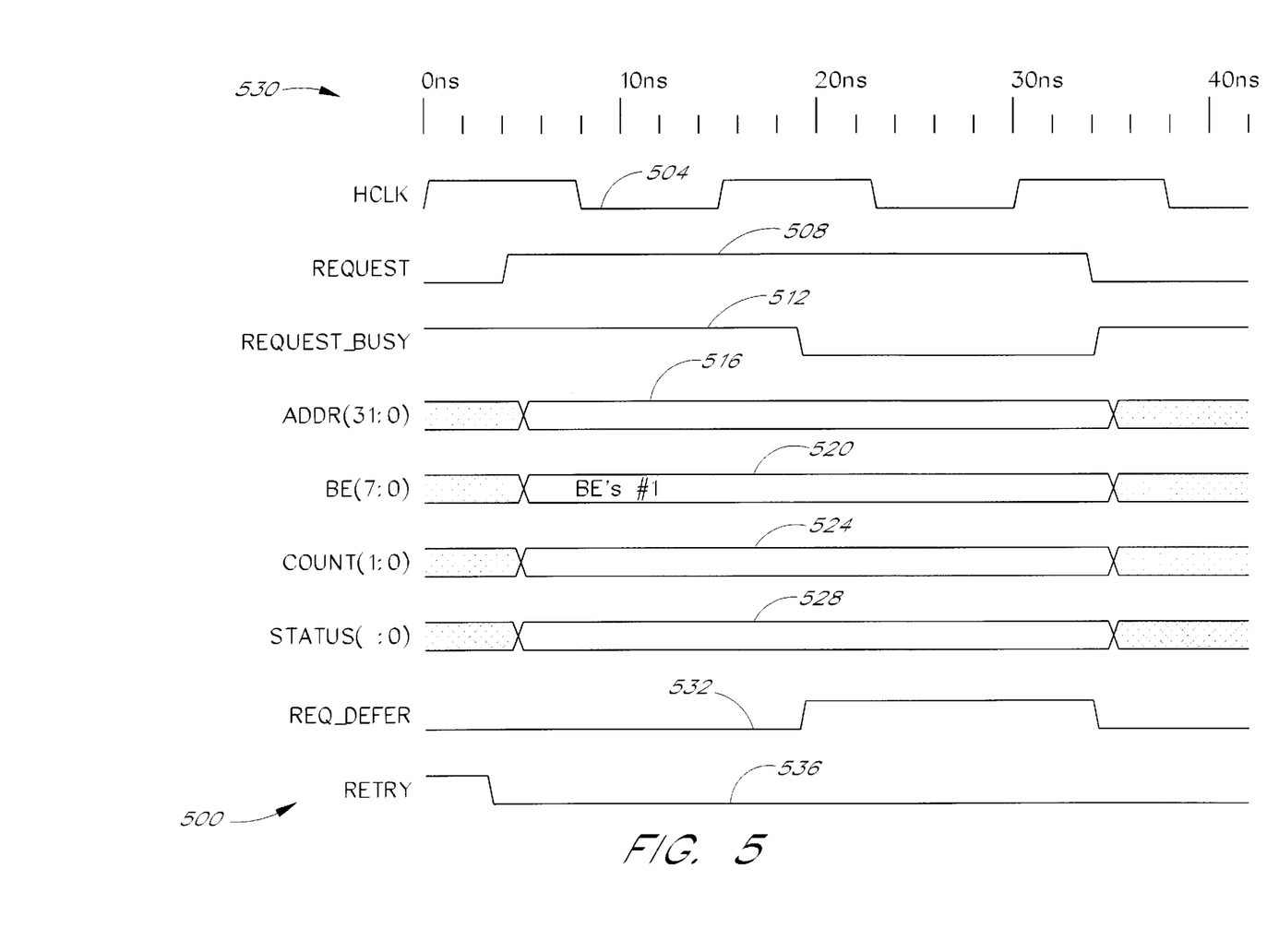
FIG. 5 is a timing diagram for a deferred transaction as executed by the internal control bus of FIG. 3.

FIG. 5 is a timing diagram for a deferred transaction as executed by the IC bus of FIG. 3. The timing diagram 500 shows the logical states of the various interface signals of the IC bus 330 during a deferred read transaction as a function of time. The IDE Controller 320 and the HM 310 manipulate interface signals in the timing diagram 500 during a deferred read transaction. As shown in FIG. 5, the HCLK 504 is a clock signal controlling the timing of the various interface signal transitions during a transaction on the IC bus 330. A timescale 530 in nanoseconds (nsec.) is shown to indicate the time separation between various timing events. As shown in FIG. 5, at about 4 nsec., the IDE Controller 320 asserts a REQ signal 508 to request a read operation from a target device. At about 18 nsec., the HM 310 responds to the REQ signal 508 by asserting a low REQ_BUSY signal 512 to indicate that it is ready to accept the request commands (i.e., data) from the IDE Controller 320. During the duration of the low REQ_BUSY signal 512, the HM 310 captures the flow of data from the IDE Controller 320 including the ADDR signal 516, the BE signal 520, COUNT signal 524, and STATUS signal 528. Moreover, at substantially the same time as the transition of the REQ_BUSY signal to low, the HM 310 asserts the REQ_DEFER signal thereby indicating to the IDE Controller 320 that the request may be deferred by the target device. Finally, the RETRY signal 536 is kept low during the entire duration of the transaction on the IC bus 330 thereby indicating that no retry transaction will occur.

In view of the foregoing, it will be appreciated that the invention overcomes the long-standing need for a system for peer-to-peer mastering over a computer bus, e.g., the P6 bus. The system provides the ability of master devices, e.g., host bridges, to defer bus transactions without the disadvantages of tying up the host bus or issuing retry transactions. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of communication in a computer system having a processor connected to a host bus, a requester connected to a first bus, and a target connected to a second bus, the method comprising:

initiating a request by the requester to a first device via the first bus, the first device connecting the first bus to the host bus;

sending the request by the first device to a second device via the host bus, the second device connecting the host bus to the second bus; and deferring response to the requester when the target is unavailable to respond.

2. In a computer system having a processor connected to a host bus, a requester connected to a first bus, and a target connected to a second bus, a program storage device storing instructions that when executed by the computer perform a method of communication between the requester and the target, the method comprising:

initiating a request by the requester to a first device via the first bus, the first device connecting the first bus to the host bus;

sending the request by the first device to a second device via the host bus, the second device connecting the host bus to the second bus; and deferring response to the requester when the target is unavailable to respond.

3. The storage device as defined in claim 2, wherein the method comprises receiving the request by the second device from the first device via the host bus.

4. The storage device as defined in claim 3, wherein the method further comprises sending the request from the second device to the target via the second bus.

5. A system for communication in a computer system having a processor connected to a host bus, a requester connected to a first bus, and a target connected to a second bus, the system comprising:

means for initiating a request by the requester to a first device via the first bus, the device connecting the first bus to the host bus;

means for sending the request by the first device to a second device via the host bus, the second device connecting the host bus to the second bus; and means for deferring response to the requester when the target is unavailable to respond.

6. The system as defined in claim 5, wherein the initiating means comprises means for sending a request to the first device via a PCI bus.

7. The system as defined in claim 5, wherein the second bus includes a PCI bus.

8. The system as defined in claim 5, wherein the initiating means comprises means for issuing a cache line read request.

9. The system as defined in claim 5, wherein the deferring means comprises means for sending a request defer signal on the host bus indicating that the request is deferred when the target is unavailable to respond.

10. The system as defined in claim 5, wherein the deferring means comprises means for freeing up the host bus when the target is unavailable to respond.

11. A system for communicating information to a target connected to a first bus, the system comprising:

a host bus configured to communicate a request from a requester via a second bus; and a device connecting the host bus to the first bus, the device being configured to receive the request via the host bus, send the request to the target via the first bus, and defer response by the target over the host bus when the target is unavailable to respond.

12. The system as defined in claim 11, wherein the device is configured to send a request defer signal on the host bus indicating that the request is deferred when the target is unavailable to respond.

13. The system as defined in claim 11, wherein the device is configured to issue a cache line read request over a PCI bus.

14. The system as defined in claim 11, wherein the device is configured to communicate with a plurality of targets concurrently.

15. The system as defined in claim 11, wherein the device is configured to free up the host bus when the target is unavailable to respond.

16. The system as defined in claim 11, wherein the device is configured to return a response having a data defer signal indicating that the response belongs to a deferred request.

17. The system as defined in claim 11, wherein the first bus conforms to a PCI bus protocol.

18. The system as defined in claim 11, wherein the first bus comprises a memory bus communicating with a main memory.

* * * * *